United States Patent
West et al.

(10) Patent No.: US 6,662,111 B2
(45) Date of Patent: Dec. 9, 2003

(54) METHOD FOR ANALYZING REFLECTION CURVATURE IN SEISMIC DATA VOLUMES

(75) Inventors: Brian P. West, Houston, TX (US); Steven R. May, Missouri City, TX (US); Dominique Gillard, Houston, TX (US); John E. Eastwood, Bellaire, TX (US); Michael D. Gross, The Woodlands, TX (US); Thomas J. Frantes, The Woodlands, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 3 days.

(21) Appl. No.: 10/179,631

(22) Filed: Jun. 25, 2002

(65) Prior Publication Data

US 2003/0009289 A1 Jan. 9, 2003

Related U.S. Application Data

(60) Provisional application No. 60/302,525, filed on Jun. 29, 2001.

(51) Int. Cl.[7] .................................................. G01V 1/28
(52) U.S. Cl. ........................................... 702/14; 702/16
(58) Field of Search .............................. 702/14, 16–18, 702/10, 156

(56) References Cited

U.S. PATENT DOCUMENTS

| | | | |
|---|---|---|---|
| 5,537,320 A | 7/1996 | Simpson et al. ............ 364/421 |
| 5,629,904 A | 5/1997 | Kosloff et al. ................ 367/53 |
| 5,671,136 A | 9/1997 | Willhoit, Jr. ................ 364/421 |
| 5,873,051 A | 2/1999 | Van Bemmel et al. ........ 702/17 |
| 5,940,778 A | 8/1999 | Marfurt et al. ............... 702/16 |
| 5,999,885 A | 12/1999 | Van Bemmel et al. ........ 702/14 |
| 6,018,498 A | 1/2000 | Neff et al. .................... 367/72 |
| 6,049,759 A | 4/2000 | Etgen .......................... 702/14 |
| 6,131,071 A | 10/2000 | Partyka et al. ............... 702/16 |
| 6,138,076 A * | 10/2000 | Graf et al. .................... 702/14 |
| 6,223,126 B1 | 4/2001 | Neff et al. .................... 702/16 |
| 6,226,596 B1 | 5/2001 | Gao ............................. 702/16 |
| 2002/0169559 A1 * | 11/2002 | Onyia et al. .................. 702/14 |

OTHER PUBLICATIONS

Alekseev, A. S. and Burmakov, Y. A. (1980) "Determination of Spatial Parameters of Reflecting Surfaces in the Three–Dimensional Seismics", Dokl Akad Nauk SSSR vol. 253, No. 6, pp. 1339–1342.

* cited by examiner

Primary Examiner—Marc S. Hoff
Assistant Examiner—Anthony Gutierrez
(74) Attorney, Agent, or Firm—Stephen P. Koch (57) ABSTRACT

A method of calculating reflection curvature in a seismic data volume wherein an apparent dip value is calculated in a first direction to generate a first apparent dip volume. A horizontal gradient is calculated in the first direction in the first apparent dip volume using a specified length scale to generate a first curvature volume. The process may be repeated one or more times, and the individual curvature volumes combined to generate a combined curvature volume for the seismic data volume.

25 Claims, 5 Drawing Sheets

METHOD FOR ANALYZING REFLECTION CURVATURE IN SEISMIC DATA VOLUMES

This application claims the benefit of U.S. Provisional Application No. 60/302,525 filed Jun. 29, 2001.

FIELD OF THE INVENTION

This invention relates generally to the field of geophysical prospecting. More particularly, the invention is a method for analyzing reflection curvature in seismic data volumes.

BACKGROUND OF THE INVENTION

Seismic reflection geometry can play a major role in the identification and delineation of reservoir intervals. In particular, reflection curvature, also referred to as moundedness, can be a particularly useful characteristic for identifying clastic and carbonate reservoirs. This is because mounds can indicate certain depositional or compaction characteristics.

Depositional and compaction mechanisms for the creation of mounded geometries are related and the seismic expression of the resulting deposit can thus be exploited in the hydrocarbon exploration and production work process. Specifically, the identification and mapping of qualitatively mounded geometries can lead to the delineation of strongly reservoir-prone intervals.

Reflection curvature, in general, can also be employed to quantitatively estimate fracture density in carbonate reservoirs. In carbonate reservoirs, a high fracture density can mean increased producibility of hydrocarbons from that region and is often accompanied by extreme values of seismic reflection curvature. This would thus be of interest to seismic interpreters.

At present, the most frequently used technique for analyzing reflection curvature is manual seismic geometry mapping. This technique, however, comes with associated costs and trade-offs in cycle-time, potential subjectivity, and density of observations. Methods and applications of horizon-based curvature analysis are described in numerous publications, including:

Roberts, A. (1998) Curvature Analysis: "New Attributes for the Delineation of Faults, Map Lineaments and Surface Shape", Annual AAPG, Salt Lake City, Utah, May 17–20, 1998, Extended Abstract No A553 V2.

Stewart S. A. and Podolski R. (1998), "Curvature Analysis of Gridded Geologic Surfaces", in Coward M. P., Daltaban T. S. and Johnson H. (eds.), Structural Geology in Reservoir Characterization, Geological Society of London, Special Publications, 127, 133–147.

Lisle R. J. (1994), "Detection of Zones of Abnormal Strains in Structures using Gaussian Curvature Analysis", AAPG Bulletin, 78, pages 1811–1819.

Zhao, P.; Pollard, D. D.; Aydin, A.; Liu, J. (1997), "Prediction of Fracture Density In The Subsurface using Curvature and Composite Plate Methods", AGU Fall Mtg, San Francisco, Dec. 8–12, 1997, Poster No. T32B-10, EOS (TRANS AGU) Vol. 78, No. 46 (Suppl), P F677, Nov. 18, 1997.

Padgett M. J. and Nester D. C, (1991) "Fracture Evaluation of Block P-0315, Point Arguello Field, Offshore California, using Core, Outcrop, Seismic Data and Curved Space Analysis", 1st AAPG SPE et al. Conference, Houston, Tex., pages 242–268.

Luthy S. T. and Grover G. A., (1995) "Three-Dimensional Geologic Modelling of a Fractured Reservoir", Saudi Arabia, 9th SPE Middle East Oil Show, Bahrain, pages 419–430.

Belfield, W. C., "Predicting Natural Fracture Distribution in Reservoirs from 3D Seismic Estimates of Structural Curvature", SPE Rocky Mountain Reg. Mtg./Low Permeability Reservoirs Symposium, Denver, May 12–15, 2000.

Copending U.S. patent application Ser. No. 09/803,443, by Gianni Matteucci, Daniel H. Cassiani, and Larry E. Ives, "Method for Characterization of Multi-Scale Geometric Attributes", filed Mar. 9, 2001.

The publications compute principal, average, and normal curvature, or Gaussian curvature, on pre-existing gridded surfaces using gridding and finite differencing algorithms. The results of the curvature computations are used to evaluate fracture orientations and density on the basis that horizon curvature can be an indicator of the strain distribution and therefore can be related to fracture orientation and density.

However, these methods at the same time are evidence of a need for a volume-based method that does not require any pre-existing horizon interpretation or seismic gridding prior to the curvature estimation. Further, there is a need for a method that generates a full volume of reflection curvature estimates, unlike the above methods that compute curvature only on the gridded surface. Such a method would allow the interpreter to rapidly qualitatively identify mounded seismic reflection geometries or quantitatively estimate reflection curvature in a volume of seismic data.

The abstract published by Alekseev, A. S., and Burmakov, Y. A., "Determination of Spatial Parameters of Reflecting Surfaces in the Three-Dimensional Seismics" Dokl Akad Nauk SSSR Vol. 253, No. 6 pages 1339–1342, 1980, describes a method for dip and curvature characterization of seismic reflectors in 3D seismic data. However, this method is cross-correlation based and has the disadvantages of computational speed constraints and noise limitations which require appropriate filtering.

Overall, existing techniques for the qualitative identification of or quantitative estimation of geometries in seismic data are time consuming, subjective, and difficult to implement. Thus, there is a need to generate, in a computationally efficient manner, a process that enables the rapid, objective identification of seismic geometry, especially reflection curvature, so that it can be exploited in the mapping process.

SUMMARY OF THE INVENTION

The invention is a method for analyzing reflection curvature in a seismic data volume. A first horizontal direction is selected in the seismic data volume. A first length scale is selected for the horizontal gradient operators. An apparent dip value is calculated in the first direction at a plurality of dip locations from the seismic data volume. This generates a first apparent dip volume. A horizontal gradient is calculated in the first direction in the first apparent dip volume using apparent dip values at dip locations horizontally separated by a distance equal to the first length scale. This generates a first curvature volume. The process may then be repeated to generate curvature volumes for additional horizontal directions in the seismic data volume, and the individual curvature volumes may then be combined into a combined curvature volume that characterizes reflection curvature in the seismic data volume. The process may also continue with the identification of curvature regions of interest, specifically curvature size and polarity as well as amplitude size and polarity, which may then be used to extract a moundedness attribute volume.

BRIEF DESCRIPTION OF THE DRAWINGS

The present invention and its advantages may be more easily understood by reference to the following detailed description and the attached drawings in which.

While the invention will be described in connection with its preferred embodiments, it will be understood that the invention is not limited thereto. On the contrary, it is intended to cover all alternatives, modifications and equivalents that may be included within the scope of the invention, as defined by the appended claims.

DETAILED DESCRIPTION OF THE INVENTION

The invention is a method for analyzing reflection curvature in seismic data volumes. The method takes a seismic reflection or seismic attribute volume as input and generates a moundedness or reflection curvature volume as output. The purpose of the method is to assist in the identification of mounded seismic reflection geometries in seismic data.

The invention improves the ability of geoscience interpreters to recognize and map seismic geometries in seismic attribute or seismic amplitude data. Specifically, the invention is a method for the characterization of dip, curvature, moundedness or rugosity of seismic reflectors for the qualitative/quantitative estimation of reservoir facies and reservoir properties.

FIGS. 1a–1d show four sections of a flowchart illustrating the processing steps for one embodiment of the method of the invention for analyzing reflection curvature in seismic data volumes. First, at step 101 of FIG. 1a, a three-dimensional volume of seismic data samples is selected. Preferably, the volume contains a plurality of seismic data samples. Each seismic data sample is represented by a data location and a seismic data value. The seismic data is preferably seismic amplitude or seismic attribute data. The seismic data includes, but is not limited to, time- or depth-migrated seismic data such as near, far, and full stack seismic amplitude data.

The quality of the resulting output volumes are dependent upon the quality of the input seismic data. Where data artifacts or noise are present in the seismic data, the method may produce noisy results. For example, random noise in the seismic section may produce noisy results. In regions of coherent noise, on the other hand, the method will estimate the curvature of reflectors, but due to imaging problems resulting from the coherent noise, the estimate of the curvature may not have a reasonable geologic explanation. This constraint of the present method will be understood to those skilled in the art.

Figure 1A:
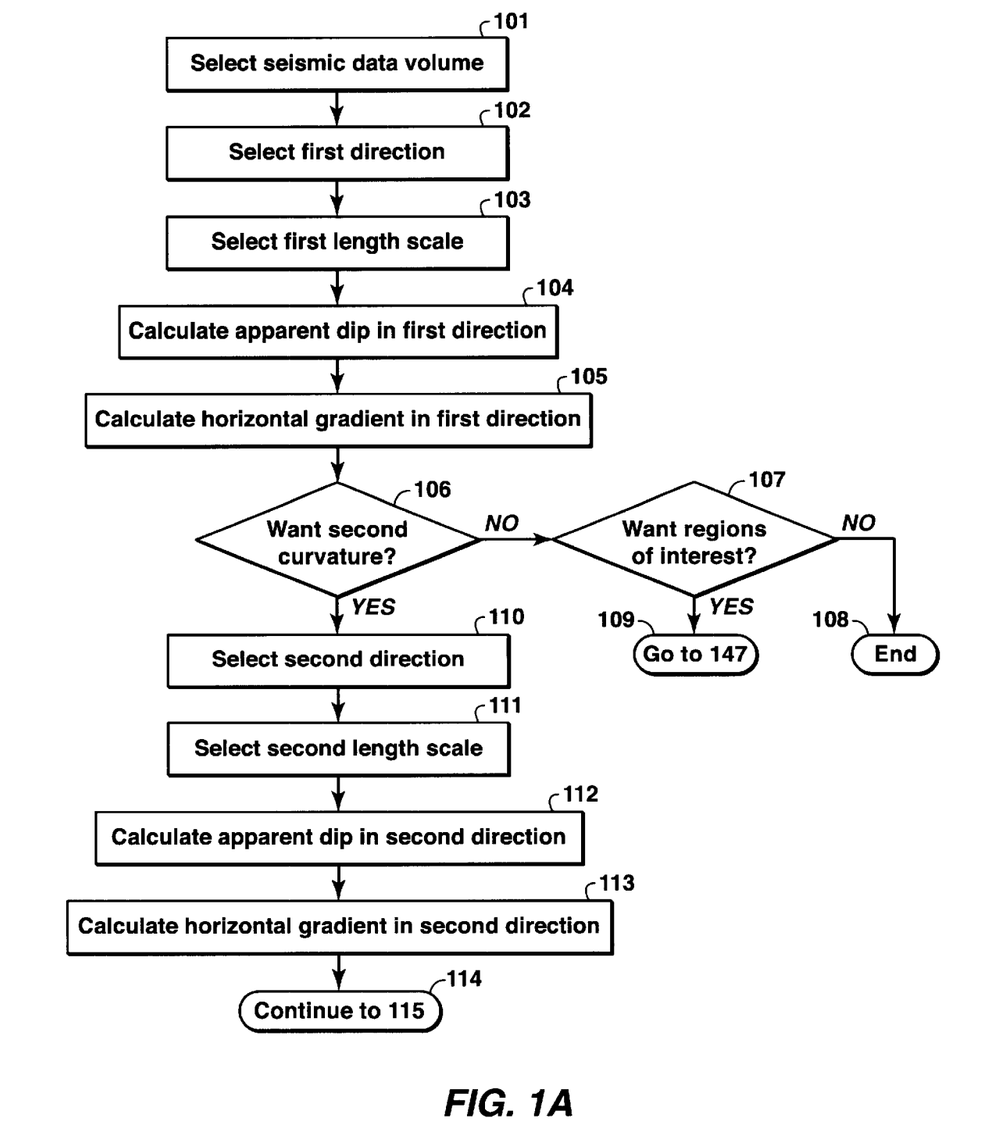
FIGS. 1a–1d are sections of a flowchart illustrating the processing steps for one embodiment of the method of the invention for analyzing reflection curvature in seismic data volumes.

Next, in step 102, a first direction is selected in the seismic data volume from step 101. The first direction is selected to be substantially horizontal and will be the direction in which a first curvature estimate will be calculated. Thus, the first direction is preferably selected to be in the primary direction of interest for analyzing curvature in the seismic data. For example, this could be the direction of the maximum change in curvature for the dominant curved structures in the seismic data volume.

In step 103, a value for a first length scale is selected. The first length scale is preferably selected to match the horizontal size in the first direction selected in step 102 of the curved structures or mounds of interest in the seismic data volume selected in step 101. The first length scale will be used to determine the size in the first direction of the difference operators in the horizontal gradient calculations used to calculate the first curvature volume. If an estimate of the horizontal extent in the first direction of the curved structures of interest is not known, then an appropriate range of length scales can be tried in an alternative embodiment.

In step 104, an first apparent dip volume $\theta_x$ is calculated in the first direction selected in step 102. Each sample point in the first apparent dip volume is represented by a dip location and a first apparent dip value. The dip locations in the first apparent dip volume preferably correspond to the data locations in the seismic data volume. Any of a number of methods for calculating the first apparent dip volume can be used. However, the preferred method is described in the co-pending patent application of Gillard et al entitled, "Method for Analyzing Dip in Seismic Data Volumes".

At step 105, a horizontal gradient dx is calculated in the first direction at a plurality of dip locations in the first apparent dip volume $\theta_x$ from step 104. In the preferred embodiment, the horizontal gradient dx is calculated at every dip location in the first apparent dip volume, but the invention is not so limited. Any appropriate subset of data locations can be used. The horizontal gradient dx is calculated as the difference between the first apparent dip values of dip locations horizontally separated in the first direction by a distance equal to the first length scale selected in step 103. This data value-based gradient calculation is described in detail in the discussion of FIG. 2 and Equation (6) below. Repetition of these horizontal gradient calculations for the entire first apparent dip volume generates a first curvature volume $K_x$.

Next, a second curvature volume is preferably calculated for the seismic data volume. At step 106, it is determined if a second curvature in a different direction is desired. If both the curvature in the seismic data volume were substantially uniform in one direction and this curvature direction were known, then this curvature direction could be selected as the first direction in step 102. Then, the first curvature volume, calculated at step 105, would contain all the curvature information available. Thus, a second curvature volume in another direction would be substantially zero and unnecessary. Unfortunately, this will not always be the case. So, if the answer in step 106 is no, then the process continues with only one curvature volume calculated to step 107. If conversely, the answer in step 106 is yes, then the process continues on to calculate a second curvature volume in step 110.

If a second curvature volume is not to be calculated, curvature regions of interest in first curvature volume $K_x$ may also be specified, step 107. If not, the process ends at step 108. If conversely, the answer is yes, then the process continues at step 147 of FIG. 1d.

Returning to the calculation of more curvature volumes at step 110, a second direction is selected in the seismic data volume from step 101. The second direction is selected to be both substantially horizontal and substantially orthogonal to the first direction selected in step 102. In a preferred embodiment, the first and second directions are selected to be the cross-line and in-line directions, respectively, of the seismic survey used to collect the seismic data in the seismic data volume from step 101. Then the first and second directions can be identified with the horizontal x and y directions of a Cartesian coordinate system describing the seismic data locations. These should be the same as those describing the dip locations in the corresponding first apparent dip volume from step 104 and the second apparent dip volume, to be constructed next. The vertical direction will be identified with the z direction of this Cartesian coordinate system. In an alternative embodiment, the first and second directions are selected to be the horizontal x and y directions, respectively, of any Cartesian coordinate system in which the seismic data locations are described, which may differ from the in-line and cross-line directions described above.

Steps 111, 112, and 113, for generation of the second curvature volume, are substantially similar to steps 103, 104, and 105 for generation of the first curvature volume. Note that the second length scale is preferably selected to match the horizontal size in the second direction of the curved structures or mounds of interest in the seismic data volume, but an appropriate range of length scales can be tested, or the second length scale may be set substantially equal to the first length scale, in alternative embodiments.

The apparent dip volume $\theta_y$ is calculated in the second direction in step 112 and a horizontal gradient dy is calculated in the second direction at step 113, following the procedures discussed above in conjunction with steps 104 through 105. The result of steps 110 through 113 is the generation of a second curvature volume $K_y$.

Figure 1B:
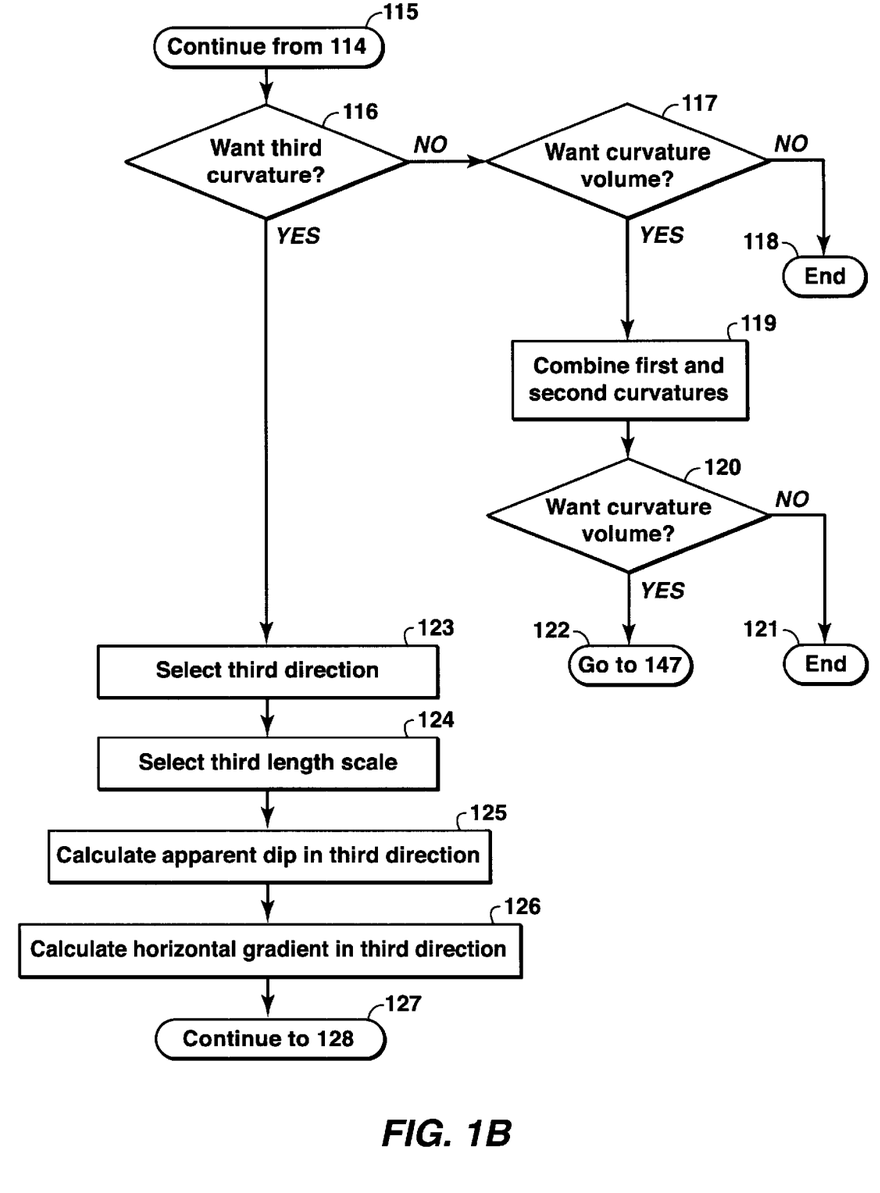

At step 114 of FIG. 1a, the process continues on to step 115 of FIG. 1b. At step 116, it is determined if an additional third curvature in a different direction is desired before a final curvature volume is calculated. Curvature estimated solely from the combination of two orthogonal horizontal dip gradients may be an incomplete estimate of true reflection curvature. For interpretative purposes such as simple identification of concave down features, however, such estimates may yield satisfactory results with in an efficient calculation time. For quantitative purposes such as quantitative fracture density calibration, however, the additional information provided by curvature estimated in a third and possibly a fourth direction is preferable. So, if the answer in step 116 is no, then the process continues to step 117 with the first and second curvature volumes. If conversely, the answer in step 116 is yes, then the process continues on to calculate more curvature volumes at step 123.

At step 117, it is determined if a curvature volume calculated from the first and second curvature volumes is desired. If the answer is no, then the process ends at step 118. If, conversely, the answer is yes, then the process continues on to step 119.

In step 119, the first and second curvature volumes, $K_x$ and $K_y$ are combined to generate a combined curvature volume K. The preferred combination is an addition of the first and second curvature volumes given by the sum in the equation $$K=K_x+K_y \tag{1}$$

Equation (1) represents a point-by-point addition of curvature volumes to generate combined curvature volume K. This produces a qualitative estimate of the true curvature of the reflector in the original seismic data volume from step 101 of FIG. 1a. If the method of the invention is applied to seismic data volumes that have not been depth-converted, then the resulting dip and curvature volumes are thus representations of the time-dip or time-curvature of the seismic reflectors. Use of this method on depth-converted seismic volumes would result in a more accurate representation of the true curvature of the seismic reflectors in the depth domain.

Next, curvature regions of interest are preferably identified in the curvature volume K. At step 120, it is determined if the identification of curvature regions of interest is desired. If the answer is no, then the process ends at step 121. If conversely, the answer is yes, then the process continues on to step 147 of FIG. 1d.

Returning to the calculation of more curvature volumes at step 123, a third direction is selected in the seismic data volume from step 101 of FIG. 1a. The third direction is selected to be both substantially horizontal and at an angle substantially equal to an odd multiple of 45° to the first direction selected in step 102 of FIG. 1a.

Steps 124, 125, and 126 are carried out in a manner consistent with the calculations for the first and second curvature volumes, as discussed above. The result is an apparent dip volume $\theta_3$, calculated in the third direction selected in step 123, and the generation of a third curvature volume, $K_3$.

Figure 1C:
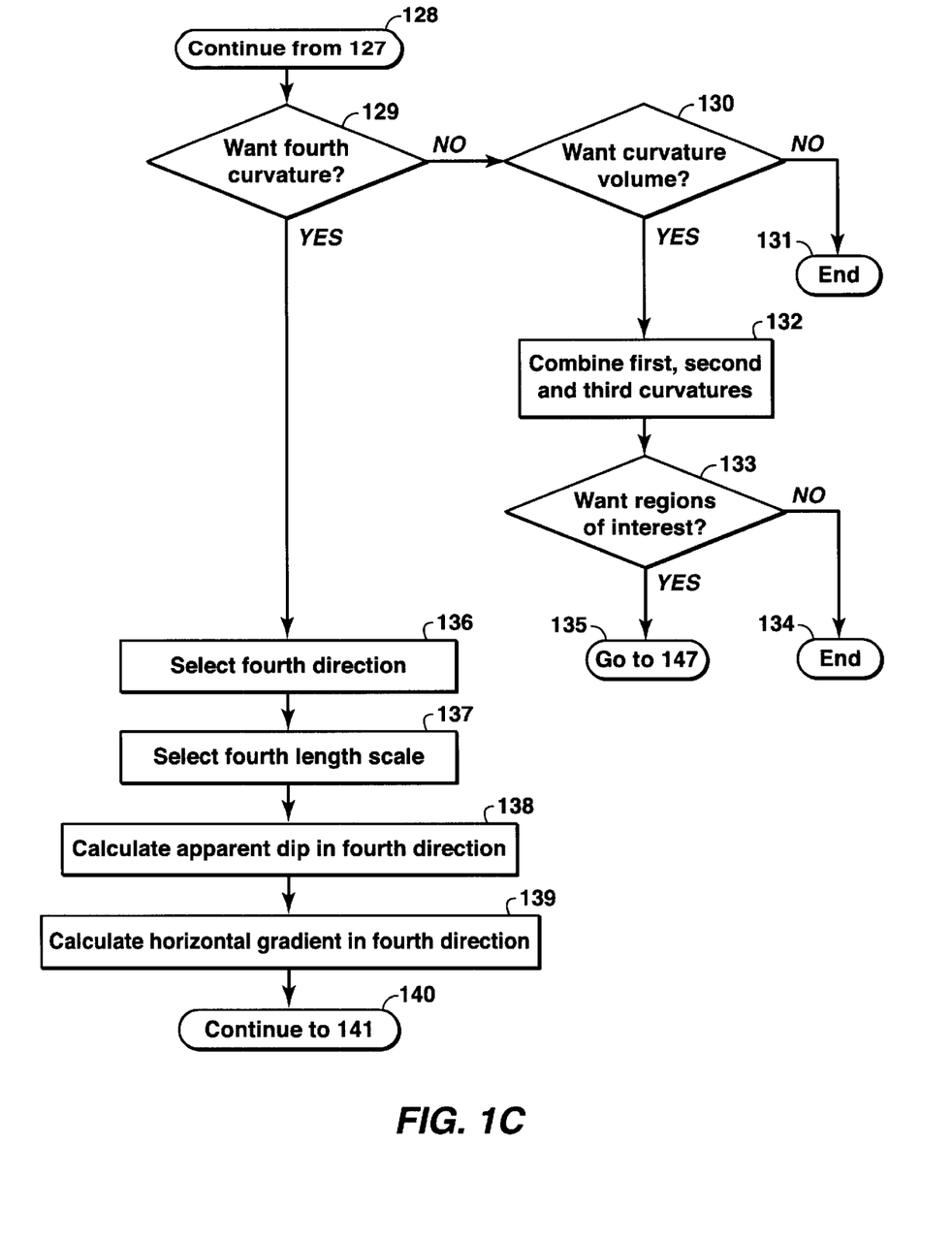

At step 127 of FIG. 1b, the process continues on to step 128 of FIG. 1c. At step 129, it is determined if an additional fourth curvature in a different direction is desired before a final curvature volume is calculated. If the answer is no, then the process continues with three curvature volumes calculated to step 130. If conversely, the answer is yes, then the process continues on to step 136 to calculate a fourth curvature volume.

At step 130, it is determined if a combined curvature volume K calculated from the first, second, and third curvature volumes is desired. If the answer is no, then the process ends at step 131. If, conversely, the answer is yes, then the process continues on to step 132.

In step 132, the first, second, and third curvature volumes, $K_x$, $K_y$, and $K_3$, are combined to generate a combined curvature volume K. Preferred combinations include, but are not limited to, the Gaussian curvature $K_G$ and average curvature $K_A$, given by the equations $$K_G = \frac{K_x K_y - K_3^2}{(1+\theta_x^2+\theta_y^2)^2} \text{ and} \tag{2}$$

$$K_A = \frac{(1+\theta_x^2)K_y - 2\theta_x\theta_y K_3 + (1+\theta_y^2)K_x}{2(1+\theta_x^2+\theta_y^2)^{3/2}}. \tag{3}$$

Equations (2) and (3) represent point-by-point arithmetic of volumes to generate curvature volumes $K_G$ and $K_A$. Other combinations include the normal curvature $K_m$ and the principal curvatures $K_1$ and $K_2$, each of which will be understood to those skilled in the art. The use of three curvature volumes, as in Equations (2) and (3), produces a better quantitative estimate of the true curvature of the reflector in the original seismic data volume than the estimate from only two curvature volumes, as in Equation (1) in step 119 of FIG. 1b.

Next, curvature regions of interest are preferably identified in the combined curvature volume K. At step 133, it is determined if the identification of curvature regions of interest is desired. If the answer is no, then the process ends at step 134. If conversely, the answer is yes, then the process continues on to step 147.

Returning to the calculation of a fourth curvature volume at step 136, a fourth direction is selected in the seismic data volume from step 101 of FIG. 1a. The fourth direction is selected to be both substantially horizontal and substantially orthogonal to the third direction selected in step 123 of FIG. 1b. In the preferred embodiment in which the first and second directions are selected to be the cross-line and in-line directions, respectively, of the seismic survey used to collect the seismic data in the seismic data volume, the third and fourth directions would then be the diagonal directions.

The selection of the length scale, step 137, the calculation of the apparent dip volume θ$_4$, step 138, and the generation of the fourth curvature volume, step 139, are also consistent with the calculations discussed above for the first three curvature volumes.

Figure 1D:
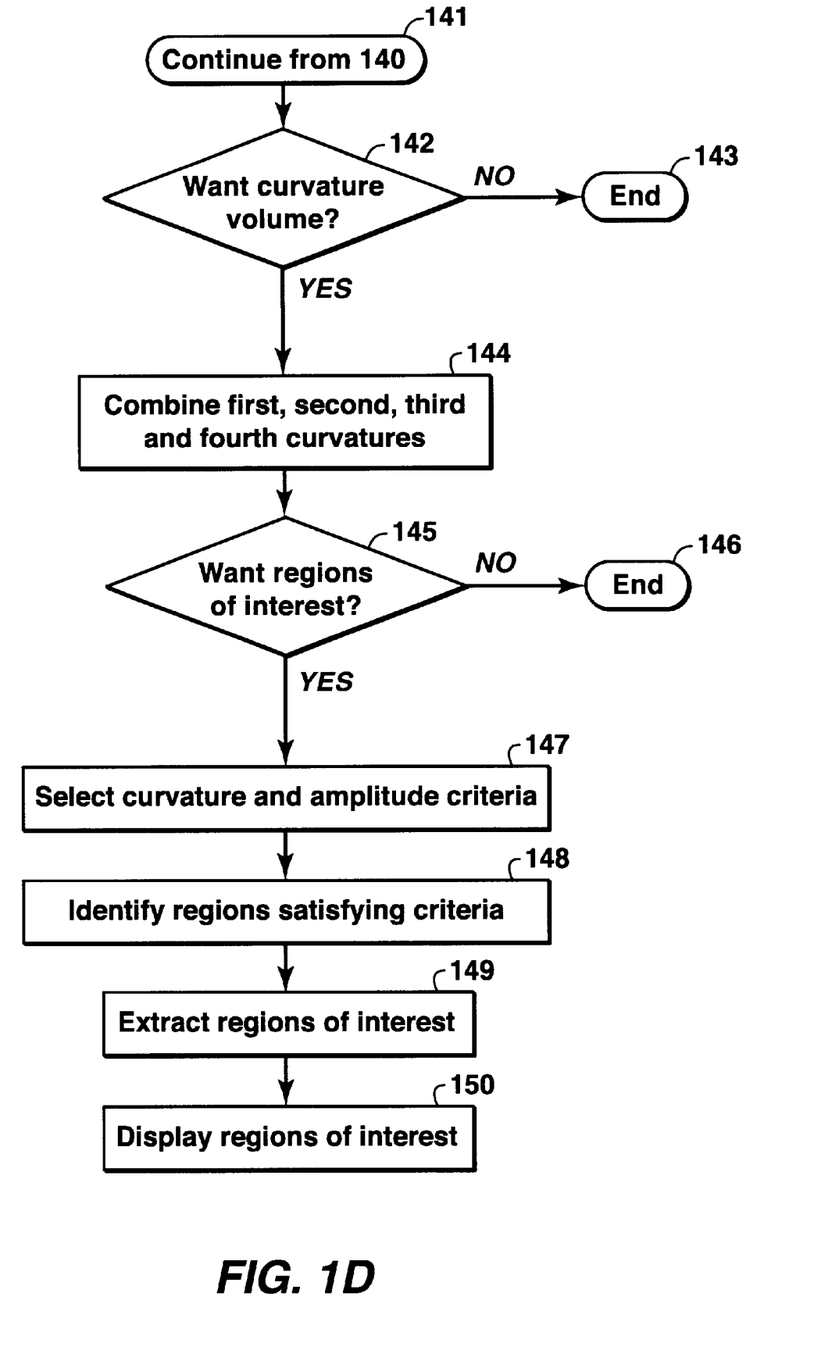

At step 140 of FIG. 1c, the process continues on to step 141 of FIG. 1d. At step 142, it is determined if a curvature volume is desired. If the answer is no, then the process ends at step 143. If, conversely, the answer is yes, then the process continues on to step 144.

In step 144, the first, second, third, and fourth curvature volumes, K$_x$, K$_y$, K$_3$, and K$_4$, are combined to generate a combined curvature volume K. Preferred combinations include, but are not limited to, the Gaussian curvature K$_G$ and average curvature K$_A$, given by the equations $$K_G = \frac{K_x K_y - K_3 K_4}{(1 + \theta_x^2 + \theta_x^2)^2}, \text{ and} \qquad (4)$$

$$K_A = \frac{(1 + \theta_x^2)K_y - \theta_x \theta_y (K_3 + K_4) + (1 + \theta_y^2)K_x}{2(1 + \theta_x^2 + \theta_y^2)^{3/2}}. \qquad (5)$$

Equations (4) and (5) represent point-by-point arithmetic of volumes to generate curvature volumes K$_G$ and K$_A$. Other combinations include the normal curvature K$_n$ and the principal curvatures K, and K$_2$. The use of three or four curvature volumes, as in Equations (2) through (5), respectively, produces a better estimate of the true curvature of the reflector than an estimate from only two curvature volumes.

Next, curvature regions of interest are preferably identified in the combined curvature volume. At step 145, it is determined if the identification of curvature regions of interest is desired. If the answer is no, then the process ends at step 146. If conversely, the answer is yes, then the process continues on to step 147.

In step 147, values for curvature criteria are selected. These criteria are used to identify curvature regions of interest in the combined curvature volumes generated in steps 105 of FIG. 1a, step 119 of FIG. 1b, step 132 of FIG. 1c, or step 144 of FIG. 1d. These curvature criteria include, but are not restricted to, the curvature size and polarity and the amplitude size and polarity of the seismic reflections of interest. Typically, these criteria are expressed as minimums and maximums of the curvature and amplitude values. Typically, negative (concave down) curvature and negative amplitude criteria are input for the extraction of mounded features from the curvature volume.

In step 148, regions in the combined curvature volume are identified that meet the curvature and amplitude criteria selected in step 147. In step 149, the curvature regions of interest identified in step 148 are extracted into a moundedness attribute volume. This final resulting volume thus contains independently identified reflectors that meet both the specified geometric and amplitude criteria. Finally, in an alternative embodiment, at step 150, the moundedness attribute volume containing the curvature regions of interest from step 149 is displayed.

Figure 2:
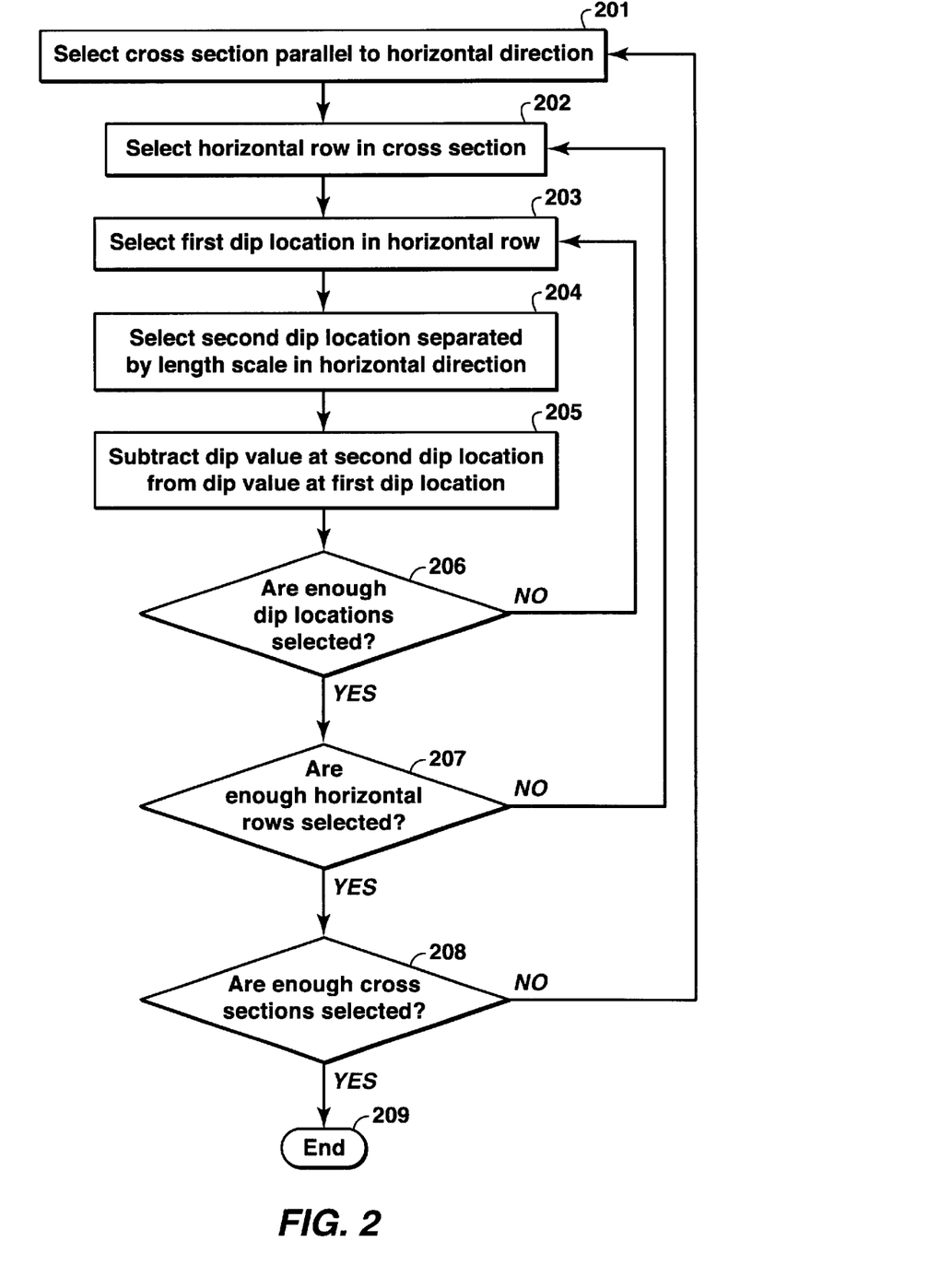
FIG. 2 is a flowchart illustrating the processing steps of an embodiment of the method of the invention for calculating horizontal gradients in apparent dip volumes.

FIG. 2 shows a flowchart illustrating the processing steps of an embodiment of the method of the invention for calculating horizontal gradients in apparent dip volumes. The horizontal gradient is calculated in a selected horizontal direction. This selected direction includes, but is not limited to, the first, second, third, and fourth directions selected above in steps 102, 110, 123, and 136, respectively, of FIGS. 1a–1d. Thus, FIG. 2 describes the preferred method for the calculations of the horizontal gradients in the first, second, third, and fourth directions in steps 105, 113, 126, and 139, respectively, of FIGS. 1a–1d.

Let D(x,y,z) represent a volume of apparent dip samples. The volume could be any of the first, second, third, or fourth apparent dip volumes constructed in steps 104, 112, 125, and 138, respectively, of FIGS. 1a–1d. The variables (x,y,z) represent the dip locations in a Cartesian coordinate system where x and y are horizontal and z is vertical. The volume of apparent dip data is typically represented as a rectangular grid aligned with the orthogonal axes of the coordinates (x,y,z). Thus, the apparent dip volume can be represented by an orthogonal grid of pixel or voxel values D$_{i,j,k}$. The index i represents a position in the horizontal direction corresponding to x, j represents a position in a mutually orthogonal horizontal direction corresponding to y, and k represents a position in a mutually orthogonal vertical direction corresponding to z. In the embodiment in which the first and second directions are selected to define a Cartesian coordinate system describing the seismic data locations, the i or x direction will correspond to the first direction, as selected in step 102 of FIG. 1a. The y or j direction will then correspond to the second direction as selected in step 110 of FIG. 1a. The third and fourth directions, selected in steps 123 and 136 of FIGS. 1b and 1c, respectively, would then correspond to the 45° diagonals defined within the same coordinate system.

Recall that length scales were selected at steps 103, 111, 124, and 137, of FIGS. 1a–1d to match the size of the curved structures or mounds in the seismic reflections of interest in different directions in the seismic data volume from step 101 of FIG. 1a. The length scale defines the horizontal gradient calculations in FIGS. 1a–1d. The horizontally separated dip locations in the horizontal gradient calculations of steps 105, 113, 126, and 139 of FIGS. 1a–1d are separated by a distance equal to the first, second, third, or fourth length scale, respectively. Since the gradient operator makes calculations based on apparent dip values at pixel locations, the length scales should preferably be equivalent to an integer number of pixel widths. In the preferred embodiment, the length scales are selected to match the scales of interest in the selected directions in the particular case.

At step 201, a two-dimensional array is selected in the three-dimensional apparent dip volume. In a preferred embodiment, the two-dimensional array is a vertical cross section in the apparent dip volume. The process will be described here in terms of vertical cross sections for specificity, although the invention is not so limited. Other two-dimensional arrays, such as horizontal cross sections, could also be used with simple modifications to the process as described. It is preferable for the selection of vertical cross sections in the apparent dip volume to be done in a systematic manner, although the invention is not limited to this. Thus, it is preferable that the first of the vertical first cross sections be selected at one end of the apparent dip volume and that each further vertical cross section be selected in sequential order along the volume in the direction for which the calculations are being performed (for example, the first direction in step 102 of FIG. 1a or the second direction in step 110 of FIG. 1a.).

At step 202, a one-dimensional array is selected within the two-dimensional array selected in step 201. The process will be described here in terms of horizontal rows in vertical cross sections for specificity, although the invention is not limited to this. Other one-dimensional arrays, such as vertical columns, could be used with simple modifications to the process as described. It is preferable for the selection of horizontal rows in the vertical cross section to be done in a systematic manner, although the invention is not limited to this. Thus, it is preferable that the first of the horizontal rows be selected at the top or bottom of the vertical cross section and that each further horizontal row be selected in sequential order down or up, respectively, through the vertical cross section.

At step 203, a first dip location is selected within the horizontal row selected in step 202. It is preferable for the selection of first dip locations in the horizontal row to be done in a systematic manner, although the invention is not limited to this. Thus, it is preferable that the initial first dip location be selected at one end of the horizontal row and that each further dip location be selected in sequential order along the row.

At step 204, a second dip location is selected separated in the selected horizontal direction from the first dip location by the appropriate length scale selected in one of steps 103, 111, 124, or 137 of FIGS. 1a–1d. At step 205, the apparent dip value at the second dip location selected in step 204 is subtracted from the apparent dip value at the first dip location selected in step 203.

Consider the embodiment in which the first and second directions are selected to coincide with the x and y axes, respectively, of a Cartesian coordinate system describing the seismic data locations. Then the pixel $D_{i,j,k}$ represents the apparent dip value of the pixel at the first dip location (i,j,k) in the vertical cross section parallel to the selected horizontal direction in the apparent dip volume. Let $D_{i+\Delta i,j,k}$ represent the apparent dip value of the pixel at the second dip location (i+$\Delta$i,j,k) displaced horizontally a distance of $\Delta$i pixels in the selected horizontal direction in the vertical cross section. Here, $\Delta$i corresponds to the first length scale selected in step 103 of FIG. 1a and the selected horizontal direction corresponds to the first direction selected in step 102 of FIG. 1a. Then the horizontal gradient dx in the first direction is preferably calculated in step 105 of FIG. 1a using the equation $$dx = D_{i,j,k} - D_{i+\Delta i,j,k} \tag{6}$$

This calculation results in an attribute volume that is effectively the second horizontal derivative or curvature $K_x$ in the first direction of the seismic reflectors. The horizontal gradient calculation given by the difference operator in Equation (6) is preferably tapered using a tapering operator, based on a cosine function, to minimize noise inherent to an area with poor data quality.

Let $D_{i,j+\Delta j,k}$ represent the apparent dip value of the pixel at the dip location (i,j+$\Delta$j,k) displaced horizontally a distance of $\Delta$j pixels in the second horizontal direction from the first dip location. Here, $\Delta$j corresponds to the second length scale selected in step 111 of FIG. 1a and the second horizontal direction corresponds to the second direction selected in step 110 of FIG. 1a. Then the horizontal gradient dy in the second direction would preferably be calculated in step 113 of FIG. 1a using the equation $$dy = D_{i,j,k} - D_{i,j+\Delta j,k} \tag{7}$$

This calculation results in an attribute volume that is effectively the second horizontal derivative or curvature $K_y$ in the second direction of the seismic reflectors. The horizontal gradient calculation given by the difference operator in Equation (7) is also preferably tapered using a tapering operator based on a cosine function.

Let $D_{i+\Delta l/\sqrt{2},j+\Delta l/\sqrt{2},k}$ represent the apparent dip value of the pixel at the dip location (i+$\Delta$l/$\sqrt{2}$, j+$\Delta$l/$\sqrt{2}$, k) displaced diagonally a distance of $\Delta$l pixels in the third horizontal direction from the first dip location. Here, $\Delta$l corresponds to the third length scale selected in step 124 of FIG. 1b and the third horizontal direction corresponds to the third direction selected in step 123 of FIG. 1b. Then the horizontal gradient dx3 in the third direction would preferably be calculated in 126 of FIG. 1b using the equation $$dx_3 = D_{i,j,k} - D_{i+\Delta l/\sqrt{2},j+\Delta l/\sqrt{2},k} \tag{8}$$

This calculation results in an attribute volume that is effectively the third horizontal derivative or curvature $K_3$ in the third direction of the seismic reflectors. The horizontal gradient calculation given by the difference operator in Equation (8) is also preferably tapered using a tapering operator based on a cosine function.

Let $D_{i+\Delta m/\sqrt{2},j-\Delta m/\sqrt{2},k}$ represent the apparent dip value of the pixel at the dip location (i+$\Delta$m/$\sqrt{2}$, j−$\Delta$m/$\sqrt{2}$, k) displaced diagonally a distance of $\Delta$m pixels in the fourth horizontal direction from the first dip location. Here, $\Delta$m corresponds to the fourth length scale selected in step 137 of FIG. 1c and the fourth horizontal direction corresponds to the fourth direction selected in step 136 of FIG. 1c. Then the horizontal gradient dx4 in the fourth direction would preferably be calculated in step 139 of FIG. 1c using the equation $$dx_4 = D_{i,j,k} - D_{i+\Delta m/\sqrt{2},j-\Delta m/\sqrt{2},k} \tag{9}$$

This calculation results in an attribute volume that is effectively the fourth horizontal derivative or curvature $K_4$ in the fourth direction of the seismic reflectors. The horizontal gradient calculation given by the difference operator in Equation (9) is also preferably tapered using a tapering operator based on a cosine function.

At step 206, it is determined whether sufficient first dip locations have been selected in the horizontal row selected in step 202. In a preferred embodiment, all dip locations in the horizontal row are selected. In an alternative embodiment, a plurality of dip locations sufficient to provide desired coverage of the horizontal row are selected. So, if the answer to the question in step 206 is no, then the process returns to step 203 to select another dip location. Steps 203 through 206 are repeated until all desired dip locations in the horizontal row have been selected as the first dip location. Then the answer to the question in step 206 is yes and the process continues to step 207.

At step 207, it is determined whether sufficient horizontal rows have been selected in the vertical cross section selected in step 201. In a preferred embodiment, all horizontal rows in the vertical cross section are selected. In an alternative embodiment, a plurality of horizontal rows sufficient to provide desired coverage of the vertical cross-section are selected. So, if the answer to the question in step 207 is no, then the process returns to step 202 to select another horizontal row. Steps 202 through 207 are repeated until all desired horizontal rows in the vertical cross section have been selected. Then the answer to the question in step 207 is yes and the process continues to step 208.

At step 208, it is determined whether sufficient vertical cross sections in the apparent dip volume have been selected. In a preferred embodiment, all vertical cross-sections in the apparent dip volume are selected. In an alternative embodiment, a plurality of vertical cross-sections sufficient to provide desired coverage of the apparent dip volume is selected. So, if the answer to the question in step 208 is no, then the process returns to step 201 to select another vertical cross section. Steps 201 through 208 are repeated until all desired vertical cross sections in the apparent dip volume have been selected. Then the answer to the question in step 208 is yes and the process ends at step 209.

The step-by-step approach of constructing a three-dimensional estimate of the reflection curvature from orthogonal two-dimensional cross sections builds on the speed advantages outlined in the preferred data value-based gradient method of constructing the dip sections, described in the co-pending patent application of Gillard et al. This results in an efficient method for providing an estimate of the curvature without diminishing the accuracy.

The seismic geometry volume produced can then be used to seismically constrain geologic models, or contribute to a volume-based seismic facies characterization. This is a significant advantage over traditional, manual seismic geometry mapping techniques that result in two-dimensional seismic maps or widely spaced one-dimensional lines that are then used to condition a geologic model. A further advantage is that although a volume-based approach is the preferred embodiment, it is not required since the gradient calculations are a data value-based calculation and thus can operate on two-dimensional data as well as three-dimensional data.

The method of the invention is capable of calculating and extracting seismic geometries on a single line or throughout a three-dimensional volume. The ability to transform standard seismic amplitude or seismic attribute volumes into seismic geometry volumes will result in significant time reduction, improved accuracy, and reproducibility within the seismic interpretation work process. Seismic geometry-attribute volumes are useful for general analysis of reservoir geometry and continuity and to condition geologic models for use in development planning and reservoir management. In particular, the method of the invention for seismic geometry analysis can significantly improve the efficiency and accuracy of seismic facies mapping efforts since seismic geometry is often a large component of the data considered in a seismic facies analysis. Additionally, the mound attribute volume can be used to relate fracture density to reflection curvature in carbonate reservoirs.

It should be understood that the preceding is merely a detailed description of specific embodiments of this invention and that numerous changes, modifications, and alternatives to the disclosed embodiments can be made in accordance with the disclosure herein without departing from the scope of the invention. The preceding description, therefore, is not meant to limit the scope of the invention. Rather the scope of the invention is to be determined only by the appended claims and their equivalents.

What is claimed is:

1. A method for analyzing reflection curvature in a seismic data volume, comprising:
   selecting a first substantially horizontal direction in the seismic data volume;
   selecting a first length scale for the first direction;
   calculating an apparent dip in the first direction at a plurality of the data locations in the seismic data volume, thereby generating a first apparent dip volume; and
   calculating a horizontal gradient in the first direction in the first apparent dip volume from the difference in apparent dip values in the first direction at locations horizontally separated in the first direction by a distance substantially equal to the first length scale, thereby generating a first curvature volume for the seismic data volume.

2. The method of claim 1 further comprising:
   identifying curvature regions of interest in the first curvature volume.

3. The method of claim 2, wherein the step of identifying curvature regions of interest comprising:
   selecting curvature size criteria;
   selecting curvature polarity criteria;
   selecting amplitude size criteria;
   selecting amplitude polarity criteria; and
   identifying regions in the true curvature volume meeting the curvature size and polarity criteria and the amplitude size and polarity criteria.

4. The method of claim 3, further comprising:
   extracting the identified curvature regions of interest into a moundedness attribute volume.

5. The method of claim 1, further comprising:
   selecting a second substantially horizontal direction in the seismic data volume, wherein the second direction is substantially orthogonal to the first direction;
   selecting a second length scale for the second direction;
   calculating an apparent dip value in the second direction at the plurality of data locations in the seismic data volume, thereby generating a second apparent dip volume; and
   calculating a horizontal gradient in the second direction in the second apparent dip volume from the difference in apparent dip values in the second direction at locations horizontally separated in the second direction by a distance substantially equal to the second length scale, thereby generating a second curvature volume for the seismic data volume.

6. The method of claim 5, further comprising:
   combining the first and second curvature volumes, generating a combined curvature volume.

7. The method of claim 6, wherein the step of combining the first and second curvature volumes comprises:
   adding the first and second curvature volumes.

8. The method of claim 6, further comprising:
   identifying curvature regions of interest in the curvature volume.

9. The method of claim 8, wherein the step of identifying curvature regions of interest comprises:
   selecting curvature size criteria;
   selecting curvature polarity criteria;
   selecting amplitude size criteria;
   selecting amplitude polarity criteria; and
   identifying regions in the true curvature volume meeting the curvature size and polarity criteria and the amplitude size and polarity criteria.

10. The method of claim 9, further comprising:
    extracting the identified curvature regions of interest into a moundedness attribute volume.

11. The method of claim 5, further comprising:
    selecting a third substantially horizontal direction in the seismic data volume, wherein the third direction is at an angle substantially equal to an odd multiple of 45° to the first direction;
    selecting a third length scale for the third direction;
    calculating an apparent dip value in the third direction at the plurality of data locations in the seismic data volume, thereby generating a third apparent dip volume; and
    calculating a horizontal gradient in the third direction in the third apparent dip volume from the difference in apparent dip values in the third location at locations horizontally separated in the third direction by a distance substantially equal to the third length scale, thereby generating a third curvature volume for the seismic data volume.

12. The method of claim 11, further comprising:

combining the first, second, and third curvature volumes, thereby generating a combined curvature volume.

13. The method of claim 12, further comprising:

identifying curvature regions of interest in the curvature volume.

14. The method of claim 13, wherein the step of identifying curvature regions of interest comprises:

selecting curvature size criteria;

selecting curvature polarity criteria;

selecting amplitude size criteria;

selecting amplitude polarity criteria; and identifying regions in the true curvature volume meeting the curvature size and polarity criteria and the amplitude size and polarity criteria.

15. The method of claim 14, further comprising:

extracting the identified curvature regions of interest into a moundedness attribute volume.

16. The method of claim 11, further comprising:

selecting a fourth substantially horizontal direction in the seismic data volume, wherein the fourth direction is substantially orthogonal to the third direction;

selecting a fourth length scale for the fourth direction;

calculating an apparent dip value in the fourth direction at the plurality of data locations in the seismic data volume, thereby generating a fourth apparent dip volume; and calculating a horizontal gradient in the fourth direction in the fourth apparent dip volume from the difference in apparent dip values in the fourth direction at locations horizontally separated in the fourth direction by a distance substantially equal to the fourth length scale, thereby generating a fourth curvature volume for the seismic data volume.

17. The method of claim 16, further comprising:

combining the first, second, third, and fourth curvature volumes, generating a combined curvature volume.

18. The method of claim 17, further comprising:

identifying curvature regions of interest in the curvature volume.

19. The method of claim 18, wherein the step of identifying curvature regions of interest comprises:

selecting curvature size criteria;

selecting curvature polarity criteria;

selecting amplitude size criteria;

selecting amplitude polarity criteria; and identifying regions in the true curvature volume meeting the curvature size and polarity criteria and the amplitude size and polarity criteria.

20. The method of claim 19, further comprising:

extracting the identified curvature regions of interest into a moundedness attribute volume.

21. The method of claim 5, wherein the first and second directions are the crossline and inline directions of a seismic survey used to collect the data in the seismic data volume.

22. The method of claim 1, wherein the step of calculating the apparent dip volume comprises:

calculating a horizontal gradient in the first direction from the difference in data values at data locations horizontally adjacent in the first direction;

calculating a vertical gradient from the difference in data values at vertically adjacent data locations; and calculating an apparent dip in the first direction from the horizontal gradient in the first direction and the vertical gradient, thereby generating the apparent dip volume.

23. The method of claim 1, wherein the step of calculating a horizontal gradient in an apparent dip volume comprises:

(a) selecting a length scale;

(b) selecting a vertical cross section substantially parallel to the first direction;

(c) selecting a horizontal row within the vertical cross section;

(d) selecting a first dip location within the horizontal row;

(e) selecting a second dip location separated in the first direction from the first dip location by a distance substantially equal to the length scale;

(f) subtracting the dip value at the second dip location from the dip value at the first dip location, thereby generating the horizontal gradient.

24. The method of claim 23, wherein the length scale is selected to match the gradient calculations in the selected direction to the scale of interest in the seismic data volume.

25. The method of claim 23, wherein the horizontal gradient calculations are modified by a tapering operator to attenuate noise.

* * * * *